United States Patent [19]
Bauer et al.

[11] Patent Number: 5,611,372
[45] Date of Patent: Mar. 18, 1997

[54] ARRANGEMENT OF SOLENOID VALVES, A CENTRAL PLUG AND A PRINTED CIRCUIT BOARD ON A CONTROL HOUSING OF AN AUTOMATIC SHIFT DEVICE OF A TOOTHED-WHEEL VARIABLE-SPEED GEARBOX

[75] Inventors: Ludwig Bauer, Stuttgart; Jürgen Semler, Alfdorf; Martin Krohn, Weinstadt; Franz Schlitzer, Hagen, all of Germany

[73] Assignees: Mercedes-Benz AG, Stuttgart; Leopold Kostal GmbH & Co. KG, Luedenscheid, both of Germany

[21] Appl. No.: 364,210

[22] Filed: Dec. 27, 1994

[30] Foreign Application Priority Data

Dec. 24, 1993 [DE] Germany .................. 43 44 584.5

[51] Int. Cl.$^6$ ..................................... F16K 31/02
[52] U.S. Cl. ................ 137/884; 137/560; 74/606 R
[58] Field of Search ........................ 137/884, 560; 251/367, 129.15; 74/606 R

[56] References Cited

U.S. PATENT DOCUMENTS

| | | |
|---|---|---|
| 4,678,006 | 7/1987 | Northman et al. .............. 137/884 |
| 4,805,490 | 2/1989 | Fuehrer et al. . |
| 4,842,021 | 6/1989 | Stoll ................................. 137/884 |
| 5,199,456 | 4/1993 | Love et al. . |

FOREIGN PATENT DOCUMENTS

| | | |
|---|---|---|
| 288038 | 5/1961 | Germany . |
| 2836166B1 | 11/1979 | Germany . |
| 3041707A1 | 6/1982 | Germany . |
| 3236535A1 | 4/1984 | Germany . |
| 3709505A1 | 1/1988 | Germany . |
| 9307228U1 | 7/1993 | Germany . |
| WO87/07351 | 12/1987 | WIPO . |

*Primary Examiner*—James Larson
*Attorney, Agent, or Firm*—Evenson, McKeown, Edwards & Lenahan, P.L.L.C.

[57] ABSTRACT

In an arrangement of solenoid valves, a central plug and a printed circuit board on a control housing of a shift device of a toothed-wheel variable-speed gearbox, the printed circuit board which secures the central plug via a receptacle is clamped in directly on the control housing with the involvement of retainers for the solenoid valves.

20 Claims, 7 Drawing Sheets

ARRANGEMENT OF SOLENOID VALVES, A CENTRAL PLUG AND A PRINTED CIRCUIT BOARD ON A CONTROL HOUSING OF AN AUTOMATIC SHIFT DEVICE OF A TOOTHED-WHEEL VARIABLE-SPEED GEARBOX

BACKGROUND AND SUMMARY OF THE INVENTION

The invention relates to an arrangement of electrically drivable solenoid valves, a central plug and a printed circuit board on a control housing for an automatic shift device of a toothed-wheel variable-speed gearbox.

In a known arrangement of the type referred to above (German Patent Document DE 37 09 505 A1), the printed circuit board is arranged at the front end, lying respectively opposite the control housing, of the solenoid valves so that column-like spacing elements are required to secure the printed circuit board to the control housing. The solenoid valves are clamped into the control housing at their end regions adjacent to said control housing by means of a common securing plate, that is to say separately from the printed circuit board. Furthermore, with the known arrangement it is costly that the socket of the central plug is secured in a housing opening of the control housing itself in a nondisplaceable fashion so that in order to make contact with the printed circuit board a finger-like projection is required which bridges the distance between the control housing and the printed circuit board.

German Patent Document DE-GM 18 35 715 discloses a switchbox for the arrangement of electromagnetic relays for controlling a motor vehicle gearbox. Because of the constant driving vibrations, important considerations with this gearbox were a reliable connection of the relay terminal contacts to the control lines and, because of the restricted space, the most compact possible accommodation of the entire arrangement in the motor vehicle. Furthermore, there was also the following secondary problem with this switchbox. The solder connections of the relay terminal contacts were most at risk from vibrations since the mass oscillations between the heavy relays and the lines could cause resonance phenomena at the attachment points, which phenomena as in the case of clamp connections, had the tendency to detach individual lines. In addition, the production of the solder terminals and their accommodation required sufficient space and additional attachment means for the relays. In the case of relays provided with terminal plugs, the lines were led to plug bases in order to permit the relays to be changed conveniently without, however, the object, of avoiding solder connections because of their sensitivity and in order to save space, on which the production of the switchbox is based having been achieved since in the case of the relays which are provided with terminal plugs the said solder connections would now be located at the base contacts. In order to achieve the described object, in the case of the known switchbox the arrangement is made such that the relays are plugged onto a baseplate in the switcbox in that plug devices which are provided on each relay and are permanently connected to mechanical parts of the relay engage directly in bushing-like recesses of the baseplate, which recesses at the same time form the terminal contacts for a prepared circuit. The plug-in openings which are provided in the baseplate are configured with wire straps which can be expanded in a sprung fashion and into which pins which are attached to the magnetic yokes of the relays engage with locking grooves. The baseplate is provided with a printed circuit whose connection points for the relays or other switching elements are formed by bushings into which contact parts of the relays which are constructed in a plug-like fashion directly engage.

German Patent Document DE 32 36 535 A1 discloses an open-loop or closed-loop control system which contains at least one signal transmitter (control instruction and/or measured value signal transmitter), one electronic evaluation circuit for the signals of the signal transmitter and at least one solenoid valve which is driven by this electronic evaluation circuit and is connected into an hydraulic or pneumatic actuation system, the evaluation circuit being arranged in the vicinity of the valve. In this publication, the following problem is taken as the starting point. For example, in anti-lock brake control systems for vehicles it is known to accommodate the evaluation circuit in the passenger compartment and to connect the sensors assigned to the wheels and the actuation valves for varying the brake pressure to the evaluation circuit by means of cables and one or two plugs. It is also known to arrange the evaluation circuit in the vicinity of the actuation valves. However, it would be necessary to use here the same number of plug-in connections, which are the cause of faults, as previously. These considerations are also intended to apply to other closed-loop or open-loop control devices. In order to avoid these problems, the teaching of the publication is that the evaluation circuit and the electromagnet or electromagnets of the solenoid valves are accommodated in a common housing and connected to one another, that the valve parts of the at least one solenoid valve are accommodated in a separate block, that the common housing is joined to this block, and that the at least one valve can be actuated via at least one tappet which leads out of the common housing and can be displaced by the at least one electromagnet.

In German Patent Document DE 30 41 707 A1, an electromagnet valve for fluids with an armature constructed as a closing element is disclosed, the armature being part of a magnetic circuit and simultaneously fulfilling hydraulic functions. The problem addressed in the publication is related exclusively to the solenoid valve for which reason the solution to the problem is seen in an electromagnetic valve for fluids with an armature constructed as a closing element, in which electromagnet valve on the one hand the armature is part of a magnetic circuit and simultaneously fulfills hydraulic functions and on the other hand the intention is that the improvement should consist in the closing element being constructed at least approximately as a cylindrical element with spherical caps at both ends. In the publication, an arrangement of solenoid valves is shown on a control housing in which, inter alia, switching valves are accommodated which set the working pressure of shift actuators of an automatic shift device of a toothed-wheel variable-speed gearbox in each case as a function of the pressure of an associated solenoid valve. In this known arrangement, the valve axes of the solenoid valves are arranged perpendicularly to a reference plane of the control housing in which support faces which are assigned to the solenoid valves and lie in each case in housing planes parallel to the reference plane are provided on the upper side which lies at the top in the installation position. The solenoid valves are fixed with respect to the control housing in the directions parallel to the reference plane in each case by means of the positively engaging seating of a valve housing base which is coaxial to the valve axis in a corresponding receptacle, having the associated support face, of the control housing and in the direction perpendicular to the reference plane and pointing away from the control housing by means of retainers, the retainers engaging in each case on a corresponding counteracting face of the solenoid valve housing of a solenoid valve. The end side, lying opposite the control housing, of a solenoid valve housing is used as counteracting face, the solenoid valves being clamped in pairs with their counteracting faces by means of a common retainer in each case, the said retainer being anchored on an attachment screw which can be screwed into a threaded hole of the control housing.

In DE German Patent Document 93 07 228 U1, a control system, in particular gearbox control system for a motor vehicle is disclosed, the said control system having a housing which is partially filled with oil and in which electrical, mechanical and/or hydraulic control means are arranged, and having functionally associated control electronics. In this known control system, the space available in the gearbox casing is used because the control electronics are arranged inside the casing. An advantage of this known control system is that the lines to the control means which include the automatic gearbox with its shafts, gearwheels, clutches, brakes, etc., and a functionally associated hydraulic control with oil pump, throttle valves, controllers, sensors and hydraulic valves in order to change the gears, detected by the control electronics, of the gearbox, are very short and lines are dispensed with. Also, only a small number of plug components is required.

German Patent Document DE 28 36 166 B1 discloses a centralized electric system in motor vehicles for receiving line connections, fuses, relays and plugs and/or couplings for the connection of cable harnesses, the said centralized electric system consisting of a plurality of insulating plates which are arranged one on top of the other and bear conductor tracks on both sides, a number of which conductor tracks being through-contacted, depending on the circuit requirements, on one side of an insulating plate with conductor tracks on the other side of the same insulating plate and/or with conductor tracks of one or more further insulating plates, at least one insulating plate having fuse elements, relay holding elements and plug connecting elements. In order to produce a centralized electric system which considerably reduces the outlay in terms of punching tools and avoids through-contacting of the conductor tracks of different printed circuit boards with one another via riveted and/or soldered pins, and excludes internal plug-in connections between conductor tracks and fuse mounts and relay connections, makes the plug-in connection system more variable, improves operation, permits simple, cost-effective assembly and in which circuit changes can be carried out easily and quickly without a large cost outlay, the known centralized electric system is constructed in such a way that the conductor tracks are attached as linear belts, which are insulated at least on one side and whose ends can be constructed as plugs, at a specific lateral distance, which corresponds to that of multi-plug connectors which can be connected thereto, in grooves arranged in parallel on both side faces of the insulating plates, and that second conductor tracks which are also insulated at least on one side are secured, perpendicular to the first conductor tracks and lying directly above them, at the same lateral distance as the first belts in grooves, arranged in parallel, in the insulating plates, the insulated side faces of the first and second conductor tracks facing one another and these intersecting conductor tracks of one side of an insulating plate being connected both to one another and to conductor tracks of the other side of the insulating plate in accordance with the circuit requirements by means of spot welding to one another.

An object on which the invention is based consists essentially in simplifying the securing elements for the parts arranged on the outside of the control housing and the assembly of such an arrangement in an arrangement of the type referred to above.

The disclosed object is achieved according to preferred embodiments of the invention by utilizing the printed circuit board housing for multiple functions including securing a socket for a central plug and anchoring retainers for the solenoid valves.

In the arrangement according to the invention, the printed circuit board, which advantageously rests directly on the top of the control housing, has further functions in addition to receiving line connections between the central plug and the electrically drivable solenoid valves. Thus, the printed circuit board additionally serves to secure the socket for the central plug and to anchor the retainers for the solenoid valves. The printed circuit board thus forms a premountable electric kit whose electrical functions can be tested before installation on the control housing, for example with the aid of a diagnostic device. In the arrangement according to the invention, the securing both of the printed circuit board and of the solenoid valves to the control housing is simplified.

In the arrangement according to the invention, it is made easier to assemble and replace the solenoid valves by virtue of detachable contacts between the printed circuit board and the respective solenoid valve.

In the arrangement according to the invention, larger cross-sections for the conductor tracks and thus stronger currents are made possible by using punched sheet-metal parts.

In the arrangement of the invention, savings in material are made on the securing of the solenoid valves by individual retainers, and not a sheet-metal plate which is common to all the solenoid valves, being used to secure the said solenoid valves.

In the arrangement according to the invention, the conductor tracks are arranged countersunk with respect to the adjoining surface of the printed circuit board so that short-circuits as a result of extraneous particles are avoided and the creepage current paths are increased.

In the arrangement according to the invention, the printed circuit board is additionally used to receive a temperature sensor, connected to the central plug by means of conductor tracks, for the temperature of the working oil so that a special housing with a special line routing for the temperature sensor is avoided.

In the arrangement according to the invention, the printed circuit board is additionally used to receive a start-inhibit switch which is connected to the central plug by means of conductor tracks and only permits the drive engine to be started when the selector lever is in the positions N (Neutral) and P (Park), as a result of which a special switch housing and a special line routing for this switch are avoided.

In the arrangement according to the invention, the printed circuit board is additionally used for the premountable securing element, which is movable to a limited degree, for a housing which receives at least one speed-of-revolution sensor, the speed-of-revolution sensor being connected to the central plug by means of conductor tracks. In order to obtain its limited movability, this housing can be constructionally connected to the printed circuit board exclusively by means of the conductor tracks. In the arrangement according to the invention, the socket of the central plug is mounted so as to be movable to a limited degree with respect to its securing element which is provided on the printed circuit board, so that the central plug can be aligned with respect to a significant housing hole of a gearbox casing of the toothed-wheel variable-speed gearbox, which casing receives the control housing on its underside.

Other objects, advantages and novel features of the present invention will become apparent from the following detailed description of the invention when considered in conjunction with the accompanying drawings.

DETAILED DESCRIPTION OF THE DRAWINGS

A control housing 29 for the electro-hydraulic control of a shift device, operating with pressure-medium servo-power (working pressure), of a toothed-wheel variable-speed gearbox of the planetary wheel design is attached to the underside of a gearbox casing in the customary manner (however no longer illustrated) in such a way that it lies within the oil pan. The control housing 29 is also divided in the customary manner into an upper housing part 13 and into a lower housing part 14 with the insertion of a so-called intermediate plate 15.

The dividing plane between the upper housing part 13 and the intermediate plate 15 being a reference plane 31—31. Other parallel housing planes could also serve as a reference plane.

The three housing parts 13, 14 and 15 of the control housing 29 are detachably fixed to one another by means of screw-in attachments 16.

The upper housing part 13 has on its upper side 32, lying at the top in the installation position, support faces 34 on which a printed circuit board 28 which consists of plastic rests directly with corresponding bearing faces 35 provided on its underside. The printed circuit board 28 has through-holes 51 to 56 for electrically drivable solenoid valves 21 to 26 which are each inserted into a corresponding receptacle 40 of the upper housing part 13 with a cylindrical valve housing base 39 which is coaxial with respect to their valve axis 30—30 which is aligned perpendicular to the reference plane 31—31.

The upper housing part 13 has on its upper side 32, support faces 33 which are located concentrically with respect to the respective receptacle 40 and on which the valve housing 48 of the solenoid valves 21 to 26 is seated with a corresponding bearing face 20 which is located concentrically with respect to the valve housing base 39.

The solenoid valves 21 to 26 are assigned in pairs to one tubular screw through-hole 37 of the printed circuit board 28 in each case, the said screw through-hole 37 being penetrated by a screw bolt 36 which is screwed into a threaded hole 38 on the upper side 32 of the upper housing part 13. A retainer 41, which fixes the associated valve pair 21–22, 23–24 and 25–26 with respect to the upper housing part 13 in the direction of the valve axis 30—30 pointing upwards from the upper housing part 13, is anchored between the screw head and the adjacent end 62 of the screw through-hole 37. The retainer 41 engages in each case on the end face 44 of the respective valve housing 48, which end face 44 is opposite the valve housing base 39.

The support faces 33 for the two solenoid valves 21 and 22 and the adjacent support face 34 for the printed circuit board 28 and its screw through-hole 37 lie in a housing plane 63—63 which is parallel to the reference plane 31—31, that is to say in the same axial area of a reference axis 61—61 perpendicular to the reference plane 31—31 (axis of the screw through-hole 37) so that these support faces and the associated retainer 41 lie on different end sides of the associated screw through-hole 37, that is to say on different sides of the printed circuit board 28.

In a further housing plane 64—64, of the upper housing part 13, parallel to the reference plane 31—31, there are located both the support faces 33 for the second solenoid valve pair 23–24 and the adjacent support faces 34 for the printed circuit board 28 as well as the support faces 33 for the third solenoid valve pair 25–26 and adjacent support faces 34 for the printed circuit board 28 so that the support faces of both the first solenoid valve pair 21–22 and of these solenoid valve pairs lie in the same axial area 60 of the reference axis 61—61 and thus at the end, opposite the respective retainer 41, of the respective screw through-hole 37, i.e., the retainers 41 lie on the upper side of the printed circuit board 28 and the support faces lie on the lower side.

The solenoid valves 21 to 26 each have a contact bearer 47, which projects out of the valve housing 48 radially with respect to the valve housing axis 30—30 and has two bar-shaped, sprung cutting contacts (control contacts) 45 which engage with pretension in openings of terminal contacts 46 which are connected to a central plug 27 by means of conductor tracks 49.

While the contact carriers 47 of the two solenoid valve pairs 23–24 and 25–26 each lie perpendicular to a housing plane which contains the valve axes 30—30 of the two solenoid valves which are associated in pairs, the two contact carriers 47 of the solenoid valve pair 21–22 lie facing one another and symmetrically with respect to the housing plane containing the two valve axes 30—30.

The printed circuit board 28 is integrally constructed with a bracket part 58 which lies laterally beside the control housing 29 and extends downwards from the printed circuit board 28 into the oil sump of the gearbox casing. The bracket part 58 bears at its lower end a temperature sensor 59 which is connected to the central plug 27 by means of conductor tracks 49.

The upper housing part 13 receives a selector slide valve 68 which is connected in the customary manner to a manual selector lever in the region of the driver's seat via an actuation linkage 17. The valve hole 65 of the upper housing part 13 for the selector slide valve 68 is aligned with its hole axis 66—66 both parallel to the reference plane 31—31 and parallel to the housing plane which contains the axes of the receptacles 40 for the solenoid valves 21 and 22. The hole end 67, which is open for the passage of the actuation linkage 17, of this valve hole 65 lies in a housing side wall 69, perpendicular to the reference plane 31—31, of the upper housing part 13.

Additionally, a start-inhibit switch 71 which is constructionally integrated into the printed circuit board 28 and connected to the central plug 27 by means of conductor tracks 49 can be actuated by means of the actuation linkage 17. In order to actuate it, the start-inhibit switch 71 has a tappet 70 which is aligned with its axis 18—18 parallel to the valve axis 66—66 of the selector slide valve; however, the start-inhibit switch 71 lies upwardly offset with respect to the housing plane 63—63 of the upper housing part 13 and laterally offset in the direction of the receptacles 40 for the solenoid valves 21 and 22 with respect to the valve hole 65. The free end 72 of the tappet 70 projects, for the sake of free access by the actuation linkage 17, both beyond the printed circuit board 28 and beyond the side wall 69.

The printed circuit board 28 has a V-shaped recess 73, in the area of which a housing 74 with two speed-of-revolution sensors 75 is arranged, which housing 74 is arranged so as to be movable to a limited degree with the printed circuit board 28. The speed-of-revolution sensors 75 are connected to the central plug 27 by means of conductor tracks 49. The connection which is movable to a limited degree is provided by virtue of the housing 74 being constructionally connected to the printed circuit board 28 exclusively by means of the conductor tracks 49.

The central plug 27 has a cylindrical socket 42 for the plug-in contacts 19 which are secured in the terminal wall 76 of the socket 42 and are conductively connected at their ends 77 lying on the outside of the terminal wall 76 in each case to a conductor track 49, for example by means of rivets. A stop bolt 79 which is arranged radially with respect to the central axis 78—78 of the central plug 27 extends downwards from the cylindrical terminal wall 76 and engages in a guide slot 80 of the printed circuit board 28 and limits possible pivoting movements of the socket 42 with respect to its central axis 78—78 about a pivot bearing axis 83—83 of the printed circuit board 28 to a degree which is determined by its play 81 in relation to the guide slot 80.

Figure 1:
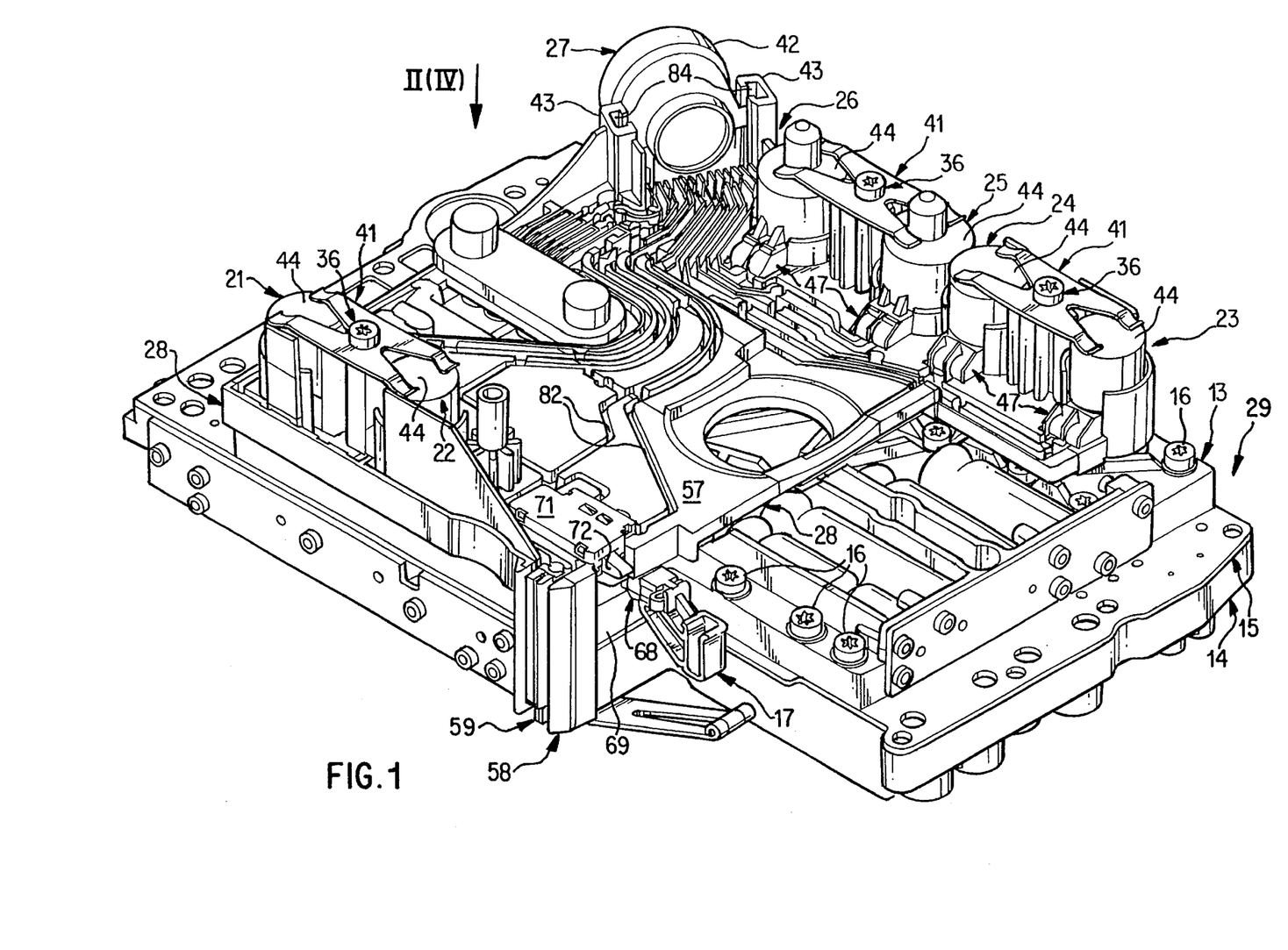
FIG. 1 shows a perspective view of a control housing with an arrangement according to the invention.
Figure 2:
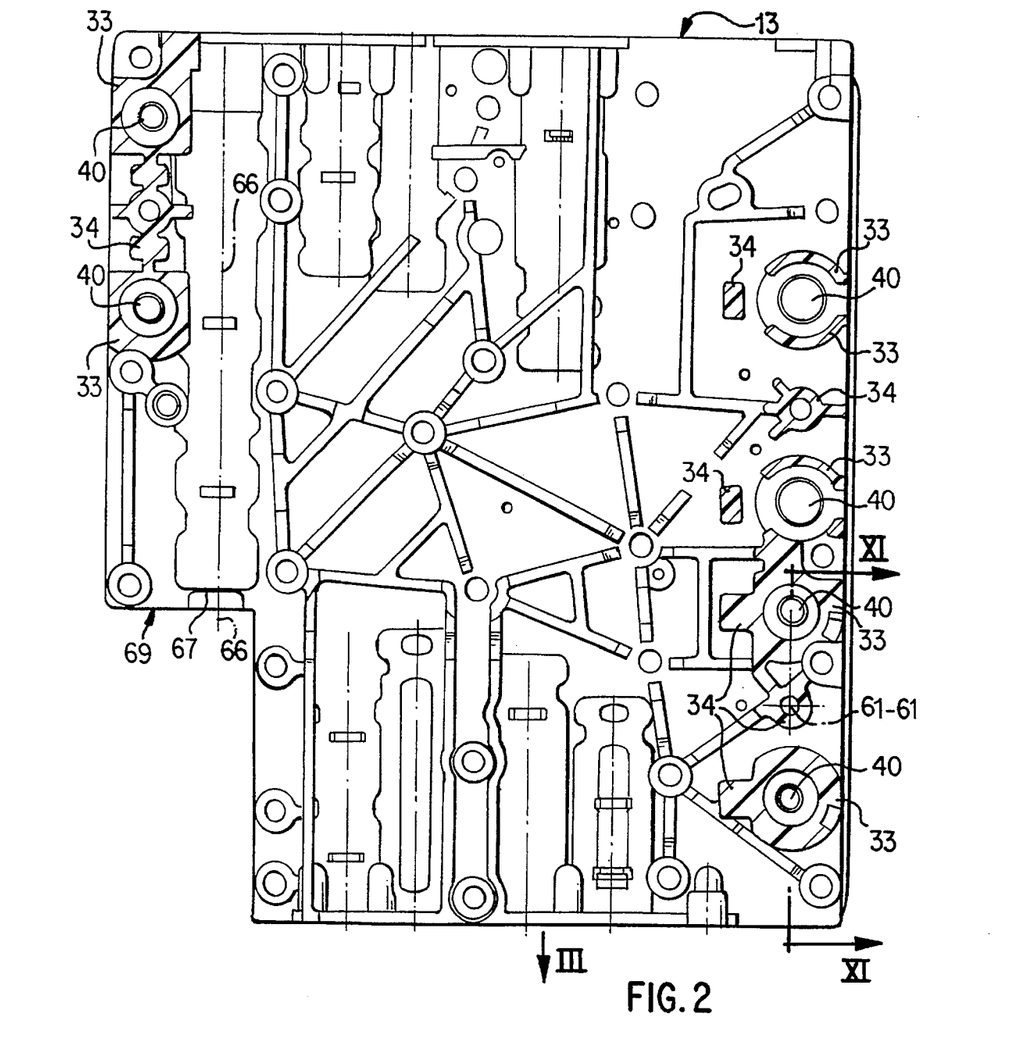
FIG. 2 shows a top view of the upper part of the control housing in FIG. 1 in an individual view, viewed in the direction of the arrow II in FIG. 1.
Figure 3:
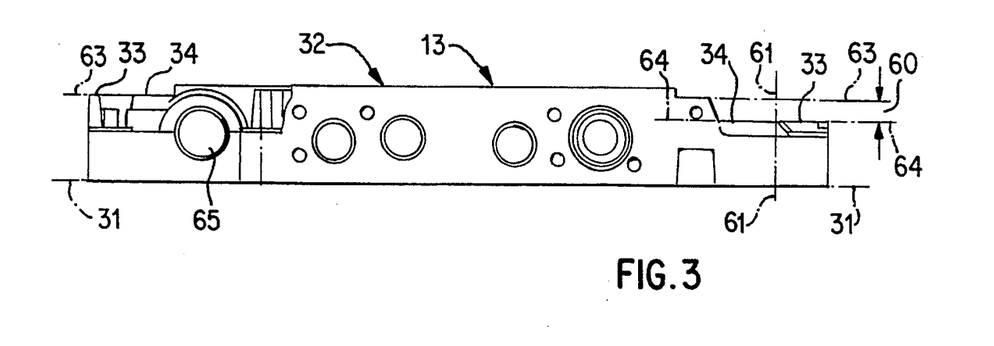
FIG. 3 shows a front view of the upper part of the housing in FIG. 2, viewed in the direction of the arrow III in FIG. 2.
Figure 4:
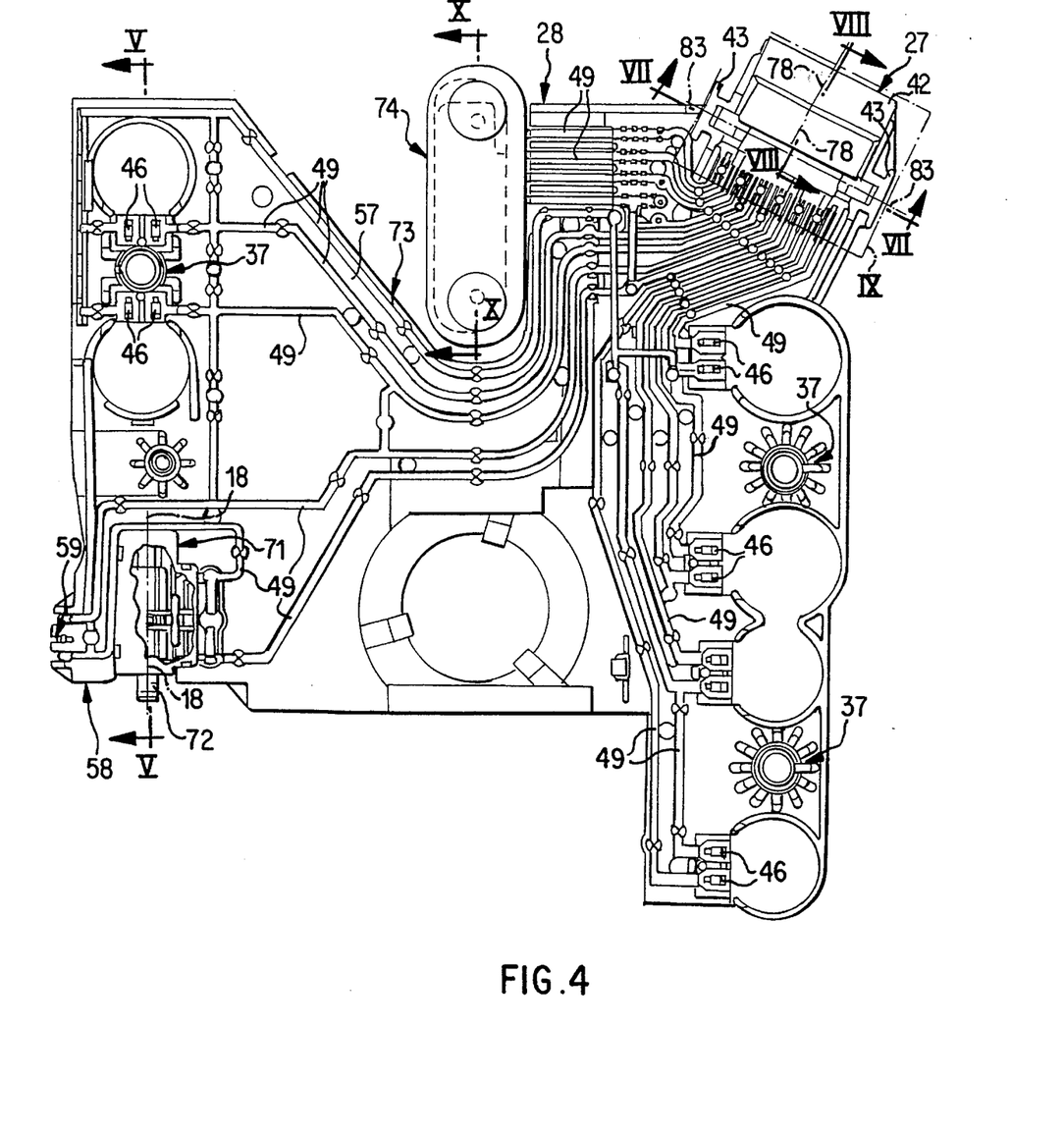
FIG. 4 shows a top view of the premounted printed circuit board of the arrangement in FIG. 1 in an individual view, viewed in the direction of the arrow IV in FIG. 1.
Figure 5:
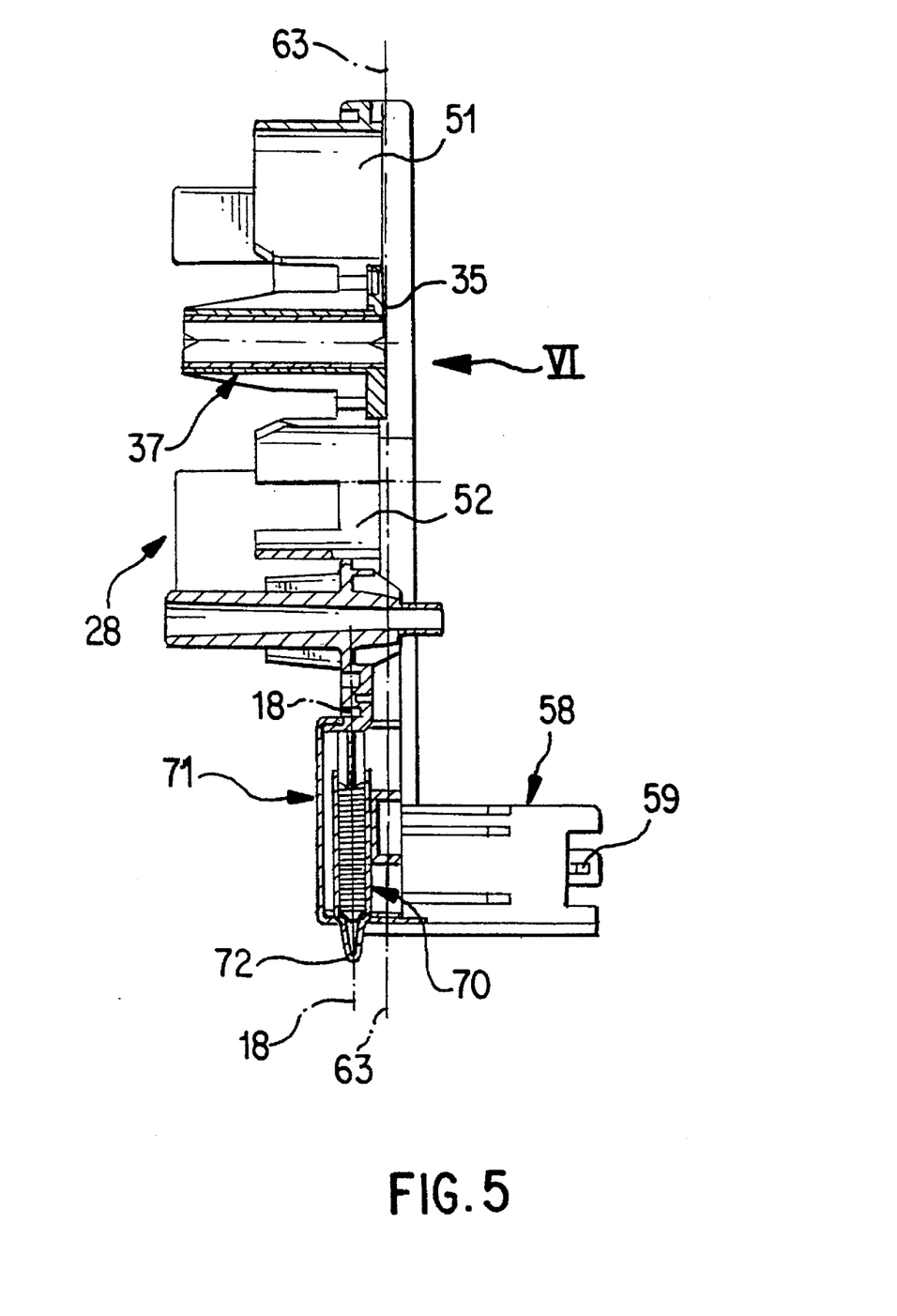
FIG. 5 shows a section through the premounted printed circuit board of the arrangement in FIG. 1 in an individual view along the line V—V in FIG. 4.
Figure 6:
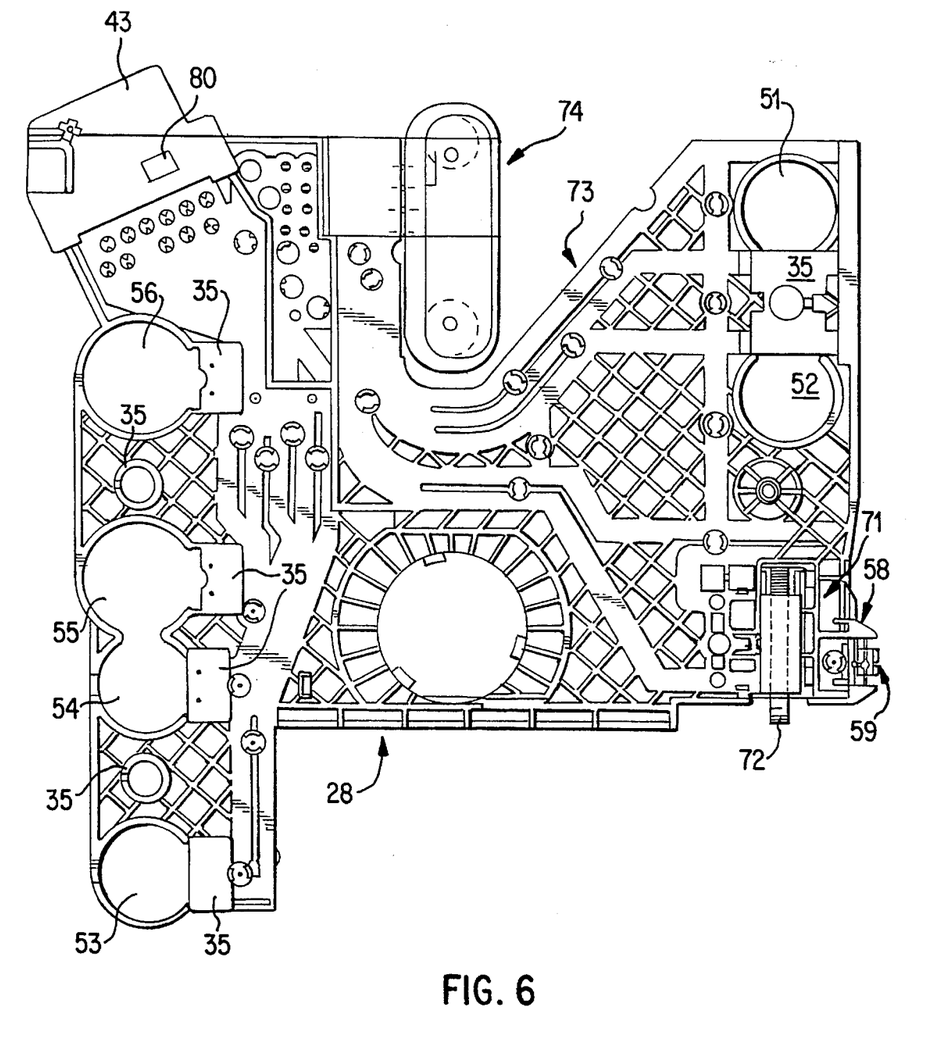
FIG. 6 shows a bottom view of the premounted printed circuit board of the arrangement in FIG. 1 in an individual view, viewed in the direction of the arrow VI in FIG. 5.
Figures 7, 8:
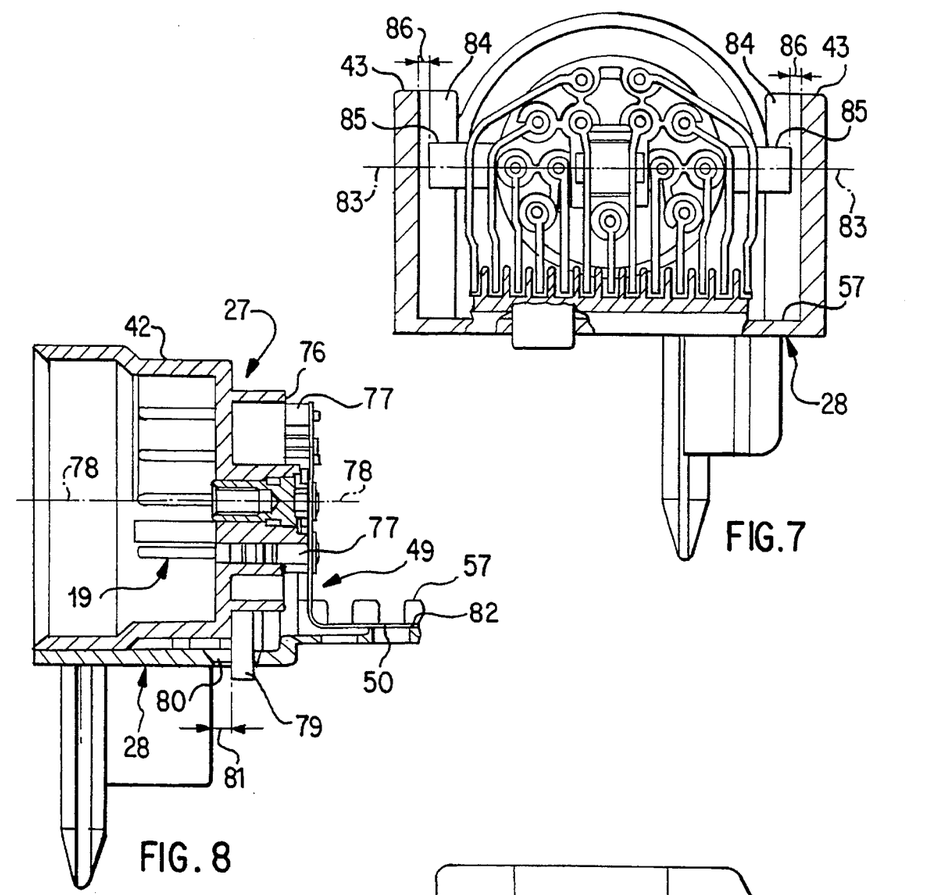
FIG. 7 shows a section through the premounted printed circuit board of the arrangement in FIG. 1 along the line VII—VII in FIG. 4 in an individual view.
FIG. 8 shows a section through the premounted printed circuit board of the arrangement in FIG. 1 along the line VIII—VIII in FIG. 4 in an individual view.
Figure 9:
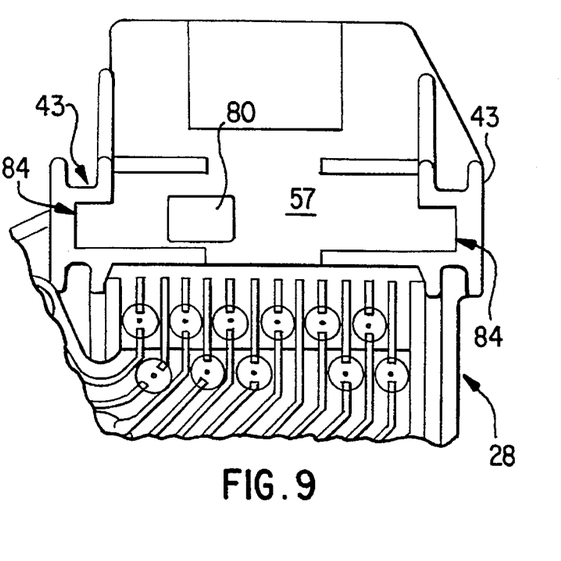
FIG. 9 shows the receptacle of the printed circuit board of the arrangement in FIG. 1 for the socket of the central plug in an individual view of the detail IX in FIG. 4.
Figure 10:
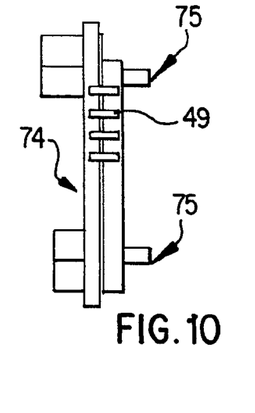
FIG. 10 shows the housing of the speed-of-revolution sensors of the premounted printed circuit board of the arrangement in FIG. 1 in a view folded along the line X—X in FIG. 4.
Figure 11:
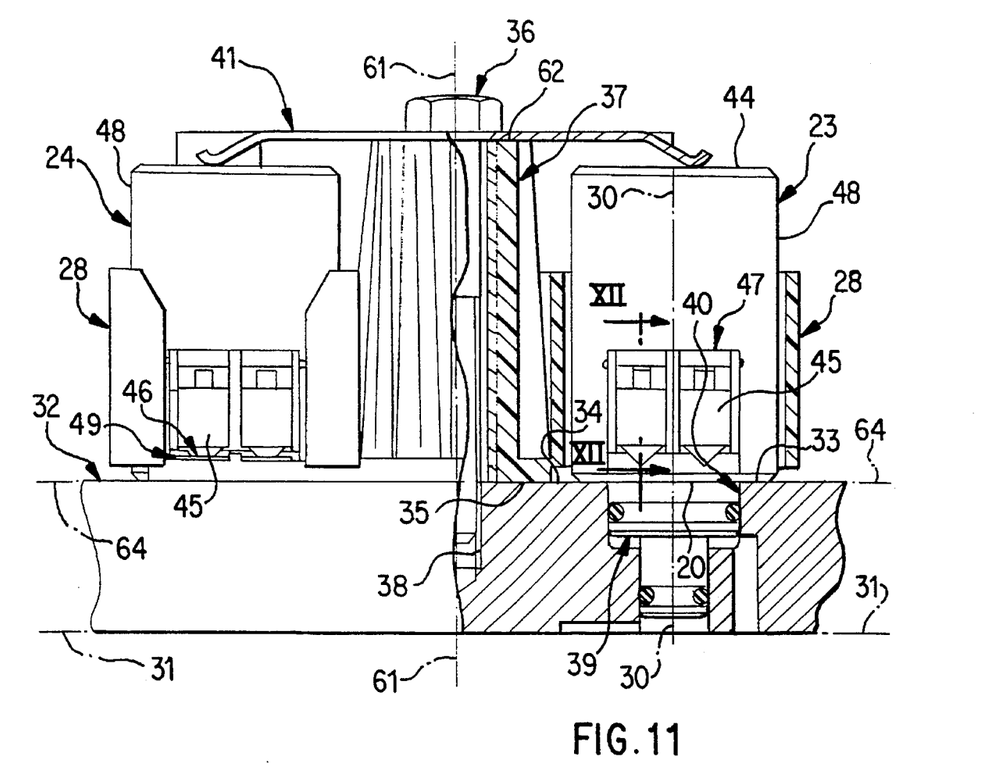
FIG. 11 shows a section through the arrangement in FIG. 1 along the line XI—XI in FIG. 2.
Figure 12:
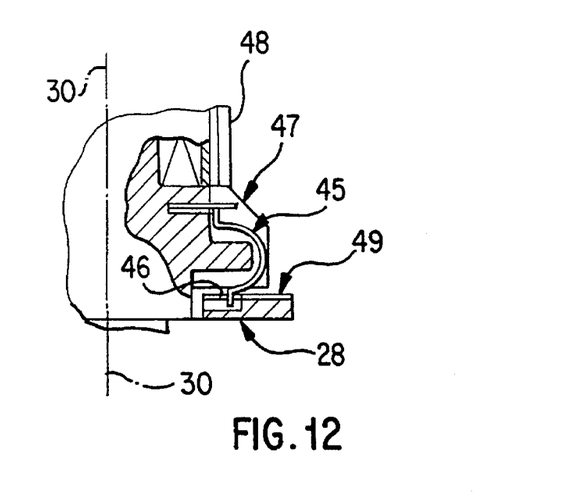
FIG. 12 shows a section through a solenoid valve of the arrangement in FIG. 1 of line XII—XII in FIG. 11.

As is clear in particular from FIG. 8, the conductor tracks 49 consist of punched sheet-metal parts 50 which are arranged countersunk with respect to the adjacent surface 57 of the printed circuit board 28 and are secured in corresponding receiving grooves 82 of the printed circuit board 28.

The printed circuit board 28 has on its upper side 57 two upright frame-shaped securing elements 43 each with a guide slot 84 into which engages in each case a bearing pin 85 which lies coaxially with respect to the pivot bearing axis 83—83 and extends away from the terminal wall 76 of the socket 42 radially with respect to the central axis 78—78;

each bearing pin 85 being arranged in each case free of play in relation to its guide slot 84 in the directions of the axis 78—78 but with play 86 in the directions of the, pivot bearing axis 83—83.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In an arrangement of electrically drivable solenoid valves having solenoid valve housings, a central plug and a printed circuit board on a control housing having housing support faces and a reference plane, in which arrangement the printed circuit board is aligned essentially parallel and valve axes of the solenoid valves are aligned perpendicular with respect to the reference plane, and further in which the housing support faces which support the solenoid valves and the printed circuit board lie in each case in housing planes parallel to the reference plane, and are provided on an upper side of the control housing in an installation position, wherein the printed circuit board is fixed in position with respect to the control housing both in a direction parallel to the reference plane and in a direction perpendicular to the reference plane and pointing away from the control housing via attachments having corresponding bearing faces in relation to the housing support faces of the control housing, and wherein the solenoid valves are fixed in position with respect to the control housing in a direction parallel to the reference plane via a positively engaging seating of a valve housing base which is coaxial to the valve axis in a corresponding receptacle and in a direction perpendicular to the reference plane and pointing away from the control housing via retainers, said retainers engaging in each case on a corresponding counteracting face of the solenoid valve housing of a solenoid valve, and a socket of the central plug being secured in a receptacle which is fixed in position with respect to the control housing, the improvement comprising:

through-holes in the printed circuit board for both the solenoid valves and the receptacle for the socket of the central plug, wherein the retainers are anchored on the printed circuit board and on said corresponding counteracting faces of the associated solenoid valve housing at a side opposite the control housing, and wherein the support faces which support the printed circuit board adjacent an axis of the respective retainer are disposed together with the support faces which support the solenoid valves of the control housing.

2. Arrangement according to claim 1, wherein the printed circuit board has a tubular through-hole for an attachment screw, and wherein a respective retainer is anchored at an end of the through-hole lying opposite the control housing by means of an attachment screw which is screwed into a threaded hole of the control housing.

3. Arrangement according to claim 1, wherein more than one of said solenoid valves are fixed with respect to the control housing via a single one of said retainers.

4. Arrangement according to claim 1, wherein a respective end side of said solenoid valve housing, lying opposite the control housing, is used as said counteracting face engaged by the retainer.

5. Arrangement according to claim 3, wherein, for the solenoid valves which are fixed via said single retainer, associated support faces of the control housing and at least one adjacent support face of the control housing which supports the printed circuit board lie in a common housing plane.

6. Arrangement according to claim 1, wherein the printed circuit board and the receptacle for the socket of the central plug are integral.

7. Arrangement according to claim 1, wherein the socket of the central plug is secured in a movably adjustable fashion in the receptacle.

8. Arrangement according to claim 1, wherein each of the solenoid valves have control contacts and the printed circuit board has associated terminal contacts, said control contacts and said associated terminal contacts being arranged so as to be detachable with respect to one another.

9. Arrangement according to claim 1, wherein the solenoid valves each have control contacts, said control contacts being arranged on a contact carrier which projects out of the solenoid valve housing transversely with respect to the valve axis.

10. Arrangement according to claim 1, wherein the printed circuit board has conductor tracks formed of punched sheet-metal parts.

11. Arrangement according to claim 10, wherein the conductor tracks are arranged countersunk with respect to an adjacent upper side of the printed circuit board.

12. Arrangement according to claim 1, wherein the printed circuit board has a bracket part which, in an installation positions, both lies laterally beside the control housing and extends away downwards from the printed circuit board perpendicularly with respect to the reference plane, and wherein a temperature sensor which is connected to the central plug by means of conductor tracks is secured in the bracket part.

13. Arrangement according to claim 12, wherein the printed circuit board and the bracket part are integral.

14. Arrangement according to claim 1, wherein the control housing has a valve hole, having an open end, for a selector slide valve which is aligned with its valve axis parallel to the reference plane and the open end of the valve hole lies in the region of a side wall, perpendicular to the reference plane, of the control housing, and wherein the printed circuit board bears a start-inhibit switch which is actuated by means of an axially displaceable tappet, the start-inhibit switch being connected to the central plug by means of conductor tracks and being arranged, with respect to its tappet, with its axis parallel to the valve axis, with a free tappet end projecting beyond the printed circuit board and side wall.

15. Arrangement according to claim 1, wherein the printed circuit board has a recess with an arrangement of a revolution sensor housing which is movable to a limited degree and which receives at least one speed-of-revolution sensor which is connected to the central plug by means of conductor tracks.

16. Arrangement according to claim 15, wherein the revolution sensor housing which accommodates sensors is constructionally connected to the printed circuit board exclusively by means of the conductor tracks of its sensors.

17. A control assembly for a shift device of a toothed-wheel variable-speed gearbox comprising:

a control housing which is attachable to the underside of a vehicle gearbox casing so as to lie within a vehicle oil pan, a printed circuit board, a central plug, and solenoid valves having respective solenoid valve housings;

wherein the central plug is secured in a circuit board receptacle, and wherein the solenoid valves are disposed in support openings in the control housing and are clamped between retainers and a support surface on the control housing, said retainers being threadably connected by threaded clamping members which extend through a through hole in the circuit board and threadably engage the control housing.

18. The control assembly of claim 17, wherein two of said solenoid valves are clamped in position by a single one of said threaded clamping members.

19. The control assembly of claim 17, wherein the printed circuit board includes an integrally formed plastic housing which contains the receptacle in the form of a frame, and a plurality of through holes for a corresponding plurality of said solenoid value housings.

20. The control assembly of claim 19, wherein respective pairs of said solenoid valve housings are clamped to the control housing by respective single clamps engaging respective sides of said solenoid valve housings facing away from the control housing, wherein said through hole is a threaded bore disposed between the respective support openings for the two solenoid valve housings of a pair.

* * * * *